Figure 1:
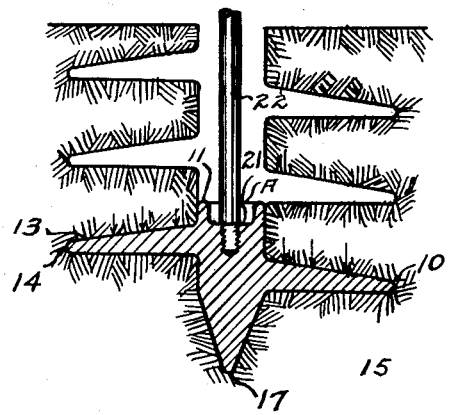

Nov. 14, 1933.    T. B. BASH    1,934,905
HELICAL MEMBER AND METHOD OF FORMING SAME
Filed Aug. 27, 1928    3 Sheets-Sheet 1

INVENTOR
THOMAS B. BASH
BY
ATTORNEYS

Nov. 14, 1933.  T. B. BASH  1,934,905
HELICAL MEMBER AND METHOD OF FORMING SAME
Filed Aug. 27, 1928  3 Sheets-Sheet 2

INVENTOR
THOMAS B. BASH
BY
Eilers & Schaumburg
ATTORNEYS

Nov. 14, 1933.                T. B. BASH                1,934,905
               HELICAL MEMBER AND METHOD OF FORMING SAME
                Filed Aug. 27, 1928        3 Sheets-Sheet 3

INVENTOR
THOMAS B. BASH
BY
ATTORNEYS

Patented Nov. 14, 1933

1,934,905

UNITED STATES PATENT OFFICE 1,934,905

HELICAL MEMBER AND METHOD OF FORMING SAME

Thomas B. Bash, Kansas City, Mo.

Application August 27, 1928. Serial No. 302,258

2 Claims. (Cl. 22—158)

This invention relates to improvements in helical members and means and methods of making same, and particularly to helical members used for ground anchors.

An object of the present invention is to provide an improved, comparatively thin bladed helical member, for the particular purpose mentioned, and to construct such a member so that it has a substantially uniform radial section, along the helix or blade.

A further object is the formation of a screw-type anchor having a helical surface adapted to exert a wedging action, outwardly and upwardly, against the adjacent earth.

An additional object is to form such an anchor, so that, when set, all points of the helical surface, are in contact with solid earth.

A still further object is an improved process and means for molding a helical member, so that the parting line, between the parts of the mold, occurs along the edge of the helix; and to attain this result without employing expensive and complicated casting means.

The older methods of casting screw-type anchors, resulted in a parting line, caused by the parts of the mold, along the anchor shaft or axis of the helix. With such a method, it is practically impossible to form a helical member of uniform section, without resorting to expensive and complicated coring. For present purposes of description, the cross-section of the helical blade is considered as taken along a line between the axis or shaft of the anchor, and the outer edge thereof, or along a radius of the helix. Such a cross-section, taken along a radius in the particular example shown, is triangular, and is substantially uniform throughout the helical blade. For purposes of the present description, it will be understood that a uniform section of the anchor blade, indicates that the different radial sections, taken progressively between the entering edge and trailing edge of the anchor, are of the same area and shape. The entering edge is considered as the lowermost edge of the anchor, and the first part of the blade to enter the earth; the trailing edge is uppermost, and the part of the blade which last enters the earth.

Under the older, prevailing process or method of casting a screw-type anchor, the section of the blade at the parting line is necessarily comparatively thick, in order to provide draft for the parts of the helical blade to be drawn out of the sand. Under the older method, the section adjacent the parting line, must be thick enough to provide draft for points on the rim of the blade, which thickness is dependent upon the pitch of the helix. The sections at other points, under the old method, must be of lesser thickness, in order to provide the necessary draft.

In setting the older, prevailing type of anchor, the blade, as it enters the earth, first presents to the soil around it, a sharp cutting section, or entering edge, then an increasingly thicker section, which decreases, in turn, to a smaller section, and so on around the blade. Such a type of anchor makes an opening in the ground, the section of which is equal to the largest cross-section of the blade, whereas the remaining portions of the blade cannot make full contact with the earth, because of their smaller cross-sections. It will therefore be readily understood that there is a great tendency for the old style anchor to creep up when placed under tension, whereas in the helical anchor member such as hereinafter described, the full area of the anchor blade is in direct contact with the earth around it.

Other objects and advantages of the present invention will appear from the drawings and the following detailed description of a preferred construction of my invention, and the method used in its formation.

It will, of course, be understood that the present article and process are described with respect to a particular embodiment of this subject matter, and that substantial alterations may be made without departing from the spirit and full scope of the invention.

Figure 2:
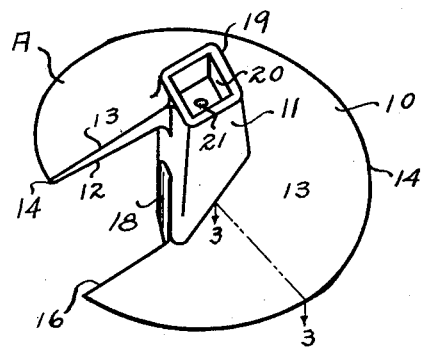
Figure 7:
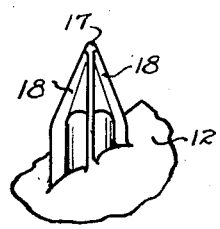
Figure 3:
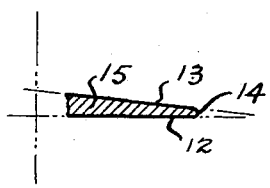
Figure 5:
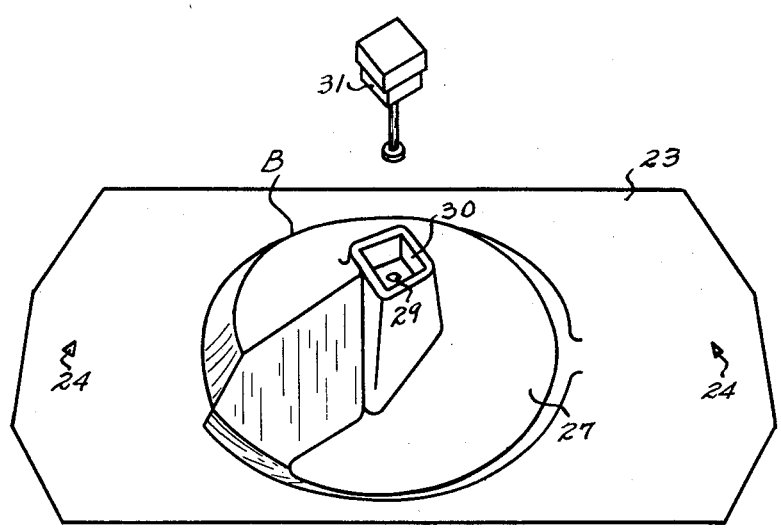
Figures 8, 9:
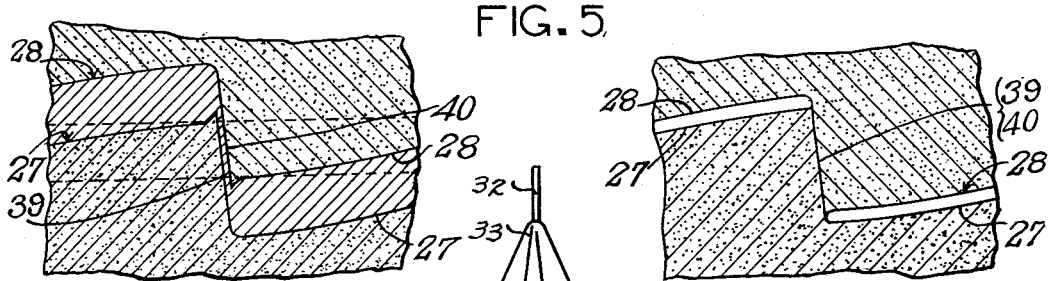
Figure 4:
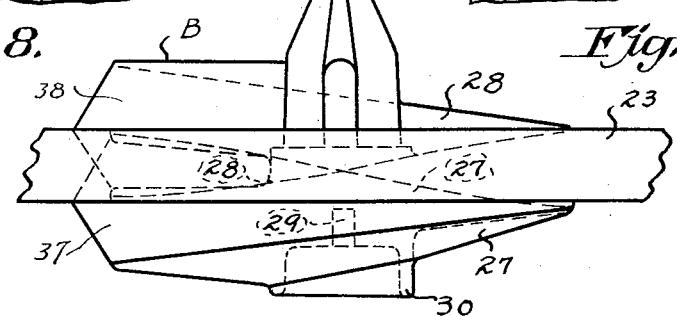
Figure 6:
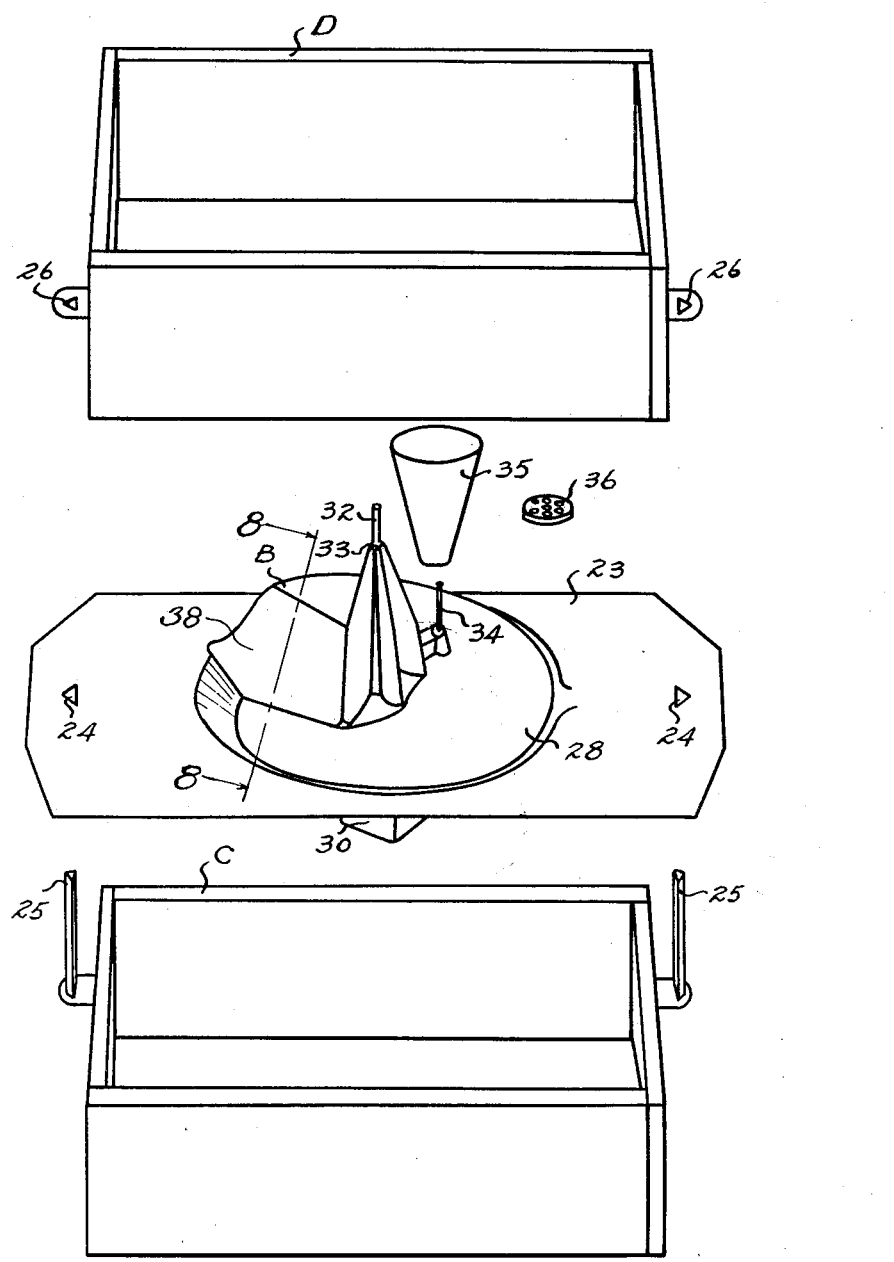

Referring to the drawings, in which like reference numerals and characters indicate similar parts throughout the several views, Fig. 1 is a sectional elevation of a preferred form of helical ground anchor, driven into the earth; Fig. 2 is a perspective view, showing particularly the upper surface, of a preferred form of anchor; Fig. 3 is a fragmentary section taken along line 3—3 in Fig. 2, and showing the triangular cross-section taken between the axis of the anchor blade and the outer edge thereof; Fig. 4 is a side elevation of a preferred form of pattern used for making the anchor shown in Fig. 2; the pattern is shown inverted, with respect to Fig. 2, and it is used in this position; Fig. 5 is a perspective view, showing one side of the pattern shown in Fig. 4; Fig. 6 is an exploded view in perspective showing a preferred arrangement of a drag, cope, and pattern, as employed in the described process and method; Fig. 7 is a fragmentary view, showing the fluted tapered portion of a preferred form of anchor; Fig. 8 is a sectional view taken at right angle to the pattern portions which develop the cutting and trailing edges of the anchor, the section being indicated by the line 8—8 of Fig. 6; and Fig. 9 is a sectional view through the mold with the pattern removed, the section of Fig. 9 corresponding to that of Fig. 8.

Referring to the drawings, a preferred form of screw-type anchor is designated, generally, at A, of which a helix or blade 10 is associated with a shaft or hub portion 11. The blade cross section may be made of any desired uniform thickness and shape, but for ease in installation and maximum holding strength, one face 12, (as shown more clearly in Fig. 3) of the blade 10 is disposed substantially perpendicularly to the axis of the shaft 11, and the other face 13 tapers off from an edge 14 at an angle best adapted to secure the desired thickness and strength of blade. The section 15 thus formed, results in an anchor, with the surface of the helix so shaped as to cause an outward and upward wedging action (as shown in Fig. 1), against the adjacent earth. The section 15 is substantially uniform throughout the entire blade helix. The blade 10 is by preference, fashioned to form an entering or cutting edge 16.

The shaft portion 11 of the anchor A tapers down at one end to a point 17, in which are provided fluted portions 18, (as shown in Fig. 7), in order to facilitate the rotation incident to driving the anchor into the earth. The other end of the shaft 11 preferably includes a square body 19, comprising an opening 20 adapted for the reception of an anchor wrench. A cored hole 21 may be provided as shown, and may be tapped to receive a threaded anchor rod 22 or the like, to serve as a connecting tension member.

It is obvious that the force necessary to drive a screw-type anchor, is largely dependent upon the thickness and section of the blade. When the starting edge 16 of the helical blade of my improved anchor enters the earth, the balance of the blade, being of a thin and uniform thickness, passes freely through the opening created by the starting edge, thus making the driving rotation of the anchor much easier than is the case with the very thick blade, of non-uniform section and thickness, now found on the older, prevailing types of screw anchors.

The helical member A is preferably formed in a sand mold by a single pattern, designated generally, as B, with which is associated a plate 23, provided with guide openings 24. The drag C, of the flask, is provided with guide pins 25 that register with openings 24, and with similar openings 26 provided in the cope D of the flask. The drag C and cope D, forming the flask, may be of any suitable type.

The pattern, in its entirety, consists of the plate 23, the thickness of which is substantially equal to one-half the pitch of the helix, and a pair of complementary, coaxial pattern portions 37 and 38 (Fig. 4), disposed on opposite sides of the plate 23. A continuous helical surface 28 is formed on one side of the pattern, in part by the portion 38, and in remainder by a helically surfaced cavity in the plate. Such helical surface is adapted to develop the face 12 of the blade. In like manner the opposite face 13 of the blade is developed by a continuous helical surface 27, formed in part on the portion 37 and in remainder by a helically surfaced cavity in the plate.

From Fig. 8, which shows a fragmentary section of the pattern embedded in the molding sand, it will appear that a pair of parallel, sloping surfaces, indicated at 39 and 40, disposed substantially at right angles to the cutting and trailing edges of the pattern, are formed in the molding sand. When the pattern is removed from the sand, these surfaces are brought into substantial coincidence, as appears from Fig. 9, which prevents the formation of a web of metal between the cutting and trailing edges of the anchor blade.

Referring to Fig. 5, the opening 29 in the shaft portion 30 of the pattern, is adapted to register with a dry sand core 31, with which the core hole 20 of the anchor is formed. A vent pipe 32 is fixed to the pointed portion 33 of the shaft 30. A pin 34, attached to the pattern, is adapted to register with a sprue and feeder member 35, for a purpose that will hereinafter appear. Feeder core 36 is provided with a number of small holes so that this element may serve as a strainer during pouring of the metal.

The details of the method and process for molding my screw-type anchor in the described, preferred form, will be apparent, to those skilled in the art, from the preceding description, but may be summarized as follows:

The flask shown in Fig. 6, is assembled with the pattern between the drag C and cope D, in a manner well known in the art. After placing the dry sand core 31 into the opening 29 of the pattern B, the molder fills this side of the flask with tamped sand, and levels off the top. The flask is then turned over and placed on a follow board in a position for filling the opposite side with sand. The sprue and feeder core 35 is placed in position on the pattern, and this side is ready for filling with sand, tamping and leveling in the usual manner. The flask is then parted and the pattern removed, leaving the dry sand core 31 protruding through the sand. The mold is now ready for pouring, through the opening left in the sand by the removal of the feeder core 35. The feeder or sprue 36 is then placed in the top of the pouring opening, previously formed by core 35.

In pouring, the hot metal enters the mold through the feeder core 36, perforated as described above, and which acts as a strainer to prevent slag or other impurities from entering the mold. The pin 32 on the pattern, forms a vent opening in the sand, so that the air and gases developing within the mold, may escape during pouring.

The opening formed by the feeder member 35, is located, by preferance, at such a point as to insure the delivery of metal to the mold, and thus to prevent any hollows, blow-holes or shrinkage cracks, while the metal is solidifying.

It will be readily seen that the above described method of forming my screw anchor, is simple, efficient, and eliminates the necessity of expensive and complicated coring. Also, by my provision for a parting line at the edges of the blade, it is obvious that any desired uniform thickness and section of blade, may be obtained; and that the resulting article comprises the described novel features, impossible of attainment under the older prevailing methods.

I claim as my invention:

1. In a pattern for use in casting a member including a helix of substantially a single turn, a plate arranged to be disposed between the cope and drag of a sand mold, said plate having a pair of helically surfaced cavities in the opposite sides thereof, a pair of complementary portions disposed coaxially on opposite sides of said plate, each adjacent one of said cavities, each of said portions having a helical surface forming a continuation of the helical surface of one of said cavities.

2. A pattern for use in casting a single-turn helical blade member in a two-part mold, including a plate adapted to be disposed between the parts of the mold, said plate having complementary spiral recesses formed in opposite sides thereof, pattern portions projecting from opposite sides of said plate, each being adjacent one of said recesses, each of said portions having a spiral surface continuous with the spiral surface of one of said recesses, and coaxial hub-defining elements projecting from opposite sides of said plate.

THOMAS B. BASH.